(12) United States Patent
Bürkner et al.

(10) Patent No.: US 11,725,631 B2
(45) Date of Patent: Aug. 15, 2023

(54) METHOD FOR TESTING A ROTOR BLADE COMPONENT OF A ROTOR BLADE FOR A WIND POWER INSTALLATION, AND ROTOR BLADE COMPONENT

(71) Applicant: Wobben Properties GmbH, Aurich (DE)

(72) Inventors: Falko Bürkner, Bremen (DE); Anna Schwabe, Aurich (DE)

(73) Assignee: Wobben Properties GmbH, Aurich (DE)

( * ) Notice: Subject to any disclaimer, the term of this patent is extended or adjusted under 35 U.S.C. 154(b) by 6 days.

(21) Appl. No.: 17/480,540

(22) Filed: Sep. 21, 2021

(65) Prior Publication Data

US 2022/0090581 A1 Mar. 24, 2022

(30) Foreign Application Priority Data

Sep. 21, 2020 (DE) .......................... 102020124550.5

(51) Int. Cl.
  *F03D 13/30* (2016.01)
  *F03D 1/06* (2006.01)
  *G01M 5/00* (2006.01)

(52) U.S. Cl.
  CPC ........... *F03D 13/30* (2016.05); *F03D 1/0675* (2013.01); *G01M 5/0025* (2013.01);
  (Continued)

(58) Field of Classification Search
  None
  See application file for complete search history.

(56) References Cited

U.S. PATENT DOCUMENTS

| 2001/0008323 A1* | 7/2001 | Reed | .................... B29C 33/0061 |
| | | | 264/267 |
| 2010/0110450 A1* | 5/2010 | Corn | ...................... G01B 11/14 |
| | | | 356/625 |

(Continued)

FOREIGN PATENT DOCUMENTS

| EP | 3418560 A1 | 12/2018 |
| WO | 2017/092766 A1 | 6/2017 |

(Continued)

*Primary Examiner* — Raul J Rios Russo
*Assistant Examiner* — Carl F. R. Tchatchouang
(74) *Attorney, Agent, or Firm* — Seed Intellectual Property Law Group LLP

(57) ABSTRACT

A method for testing a rotor blade component of a rotor blade for a wind power installation, comprising: dividing a rotor blade component of a rotor blade for a wind power installation into two, three or more rotor blade component segments, forming cutouts in a connection interface at a connection end of one of the rotor blade component segments. A rotor blade component segment of a rotor blade for a wind power installation, the rotor blade component segment comprising a connection end which has been formed by dividing a rotor blade component of a rotor blade for a wind power installation into two, three or more rotor blade component segments, a connection interface at the connection end of the rotor blade component segment, and cutouts which are formed in the connection interface and serve for connection of the rotor blade component segment to a test stand.

19 Claims, 12 Drawing Sheets

(52) U.S. Cl.
CPC ....... _G01M 5/0075_ (2013.01); _F05B 2230/10_ (2013.01); _F05B 2240/302_ (2013.01); _F05B 2260/301_ (2013.01); _F05B 2260/83_ (2013.01); _F05B 2280/6003_ (2013.01)

(56) References Cited

U.S. PATENT DOCUMENTS

| | | | |
|---|---|---|---|
| 2010/0122442 A1* | 5/2010 | Kirkpatrick | B23P 15/04 29/233 |
| 2020/0255121 A1 | 8/2020 | Rosemeier et al. | |

FOREIGN PATENT DOCUMENTS

| | | | | |
|---|---|---|---|---|
| WO | WO-2017092766 A1 * | 6/2017 | ............ | B33Y 80/00 |
| WO | 2019/086636 A1 | 5/2019 | | |
| WO | WO-2019086636 A1 * | 5/2019 | ............ | B64C 11/04 |

* cited by examiner

METHOD FOR TESTING A ROTOR BLADE COMPONENT OF A ROTOR BLADE FOR A WIND POWER INSTALLATION, AND ROTOR BLADE COMPONENT

BACKGROUND

Technical Field

The disclosure relates to a method for testing a rotor blade component of a rotor blade for a wind power installation, and to a rotor blade component segment of a rotor blade for a wind power installation.

Description of the Related Art

During the development process, in particular as part of certification procedures, of rotor blades for wind power installations, rotor blades are typically subjected to both static and dynamic tests. During such tests, a rotor blade is arranged in a test stand and is fixed at the blade root of the rotor blade. In the case of dynamic testing, it is then normally the case that cyclic forces are applied at a position or at multiple positions along the rotor blade. In this way, the rotor blade can, for example, be caused to perform a natural frequency vibration, in that the cyclic force application is realized at a frequency which corresponds to one of the natural frequencies of the rotor blade. For testing the fatigue behavior of a rotor blade during a fatigue test, there is typically realized such a cyclic force application, in the case of which the rotor blade is excited at a natural frequency of the rotor blade in order to cause the latter to perform a natural frequency vibration.

In order for the performance and the costs of wind power installations to be improved, there is a recognizable trend for the installations to have increasingly larger structural forms and/or higher rated powers. The larger structural form refers in particular to the rotor diameter and to the hub height of the wind power installations. Rotor blades of modern wind power installations can have lengths of over 100 meters.

The testing, and in particular the cyclic testing, of rotor blades is altogether associated with a high outlay in terms of time and costs. This is the case in particular for very long rotor blades. A further problem which occurs during the testing of rotor blades is that, in some sections, loads on the rotor blade significantly above the loads required for said sections can occur. This can lead to damage to the rotor blade, whereby time-consuming and costly repair work and associated interruptions to the test can occur.

The German patent and trademark office in the priority application of the present application has researched the following prior art: EP 3 418 560 A1.

BRIEF SUMMARY

One or more techniques described herein may reduce the outlay in terms of time and cost for the dynamic testing of rotor blades for wind power installations.

According to a first aspect, one or more embodiments are directed to a method for testing a rotor blade component of a rotor blade for a wind power installation that comprises: dividing a rotor blade component of a rotor blade for a wind power installation into two, three or more rotor blade component segments, forming cutouts in a connection interface at a connection end of one of the rotor blade component segments.

Preferably, the dividing of the rotor blade component of a rotor blade for a wind power installation into two, three or more rotor blade component segments is realized before the forming of cutouts in the connection interface.

A rotor blade generally extends with its main direction of extent along a longitudinal axis from a rotor blade root to a rotor blade tip. The dividing of the rotor blade component, for example of the rotor blade, is preferably realized by means of sawing with a wire saw or by means of a circular saw. The dividing of the rotor blade component is preferably realized along a plane which is arranged orthogonally to the longitudinal axis of the rotor blade and/or of the rotor blade component segment and/or of the rotor blade segment and/or of the rotor blade root.

The connection interface preferably lies in a plane to which the longitudinal axis of the rotor blade and/or of the rotor blade component segment and/or of the rotor blade segment is oriented substantially orthogonally. The connection interface is preferably arranged at the connection end of one of the rotor blade component segments.

The connection interface may be formed partially or completely by one of the rotor blade component segments, in particular by a part of one of the rotor blade component segments. In particular, the connection interface may be an end plane of one of the rotor blade component segments, in particular of a rotor blade segment. The connection interface may be formed, in particular partially or completely, by a separation surface of one of the rotor blade component segments, along which separation surface the division of the rotor blade component has been realized. The connection interface may be formed, in particular partially or completely, by an end plane in the region of spar caps of one of the rotor blade component segments.

The connection interface may also be applied, in particular partially or completely, to a connection end of one of the rotor blade component segments, wherein the application of the connection interface is preferably realized in such a way that the connection interface is arranged within and/or outside the connection end transversely to the longitudinal axis of the rotor blade and/or of the rotor blade component segment and/or of the rotor blade segment.

The cutouts are preferably each of substantially cylindrical form. It is furthermore preferable for the cutouts to each have a substantially cylindrical shaft part with a first diameter and have an enlarged head part, adjoining the opening, with a second diameter, wherein the second diameter is greater than the first diameter. In the longitudinal direction of the cutouts, the shaft part is preferably longer than the head part, in particular a number of times longer than the head part, in each case. Preferably, a longitudinal axis of each of the cutouts is substantially parallel to a longitudinal axis of the rotor blade.

A further preferred development is distinguished in that the connection interface has a multiplicity of cutouts, preferably at least 20 or at least 30 or at least 40 cutouts. The multiplicity of cutouts may be arranged in a single row or in multiple rows, in particular in two rows. Here, it is in particular preferable for the cutouts to be situated on a periphery line of a polygon or to be situated on two, three or more substantially concentric polygons. Preferably, the polygon has the cross-sectional shape and/or the shape of the outer contour of the rotor blade component segment at the connection end. The cutouts may also be situated on an elliptical path or on multiple elliptical paths. It is furthermore preferable for the cutouts to be arranged in a substantially equidistant manner in the peripheral direction.

A first advantage of such a method is that the required time for testing a rotor blade can be reduced significantly if not the undivided rotor blade is tested, but rather multiple rotor blade component segments, in particular rotor blade segments, are tested separately from one another. In comparison with the undivided rotor blade, the rotor blade segments generally have changed natural frequencies, such that the rotor blade segments can be caused to perform vibrations at higher frequencies. Consequently, in fatigue tests, a particular number of cycles can be achieved within a shorter period of time, whereby the total time of the test can be reduced. The required time for testing can be reduced by several months by way of the method described.

A further advantage is that, through the use of a connection interface at the connection end of one of the rotor blade component segments and through the formation of cutouts in the connection interface, a connection for fixing to a test stand that is more cost-effective, relatively quick to produce and more reliable can be provided.

A further advantage is that, with the testing of rotor blade component segments, overloads in some sections that are above the loads required for said sections can be reduced significantly in comparison with the testing of entire rotor blades. Thus, it is possible to reduce and/or avoid damage due to the overloads during the test, whereby it is possible to reduce and/or avoid interruptions to the test and cumbersome repair work at the rotor blade. Thus, for example, in the case of a conventional rotor blade test at the entire blade, owing to the overloads associated with the method at particular positions, loading which is 10 times greater in comparison with the required loading can occur, whereas, in the case of rotor blade component segments, in particular rotor blade segments, being tested, for example loading which is only 3.5 times greater in comparison with the required loading occurs.

A further advantage is that, in the event of an interruption to a test of one of the rotor blade component segments, tests of further rotor blade component segments that are taking place at the same time do not have to be interrupted. This likewise has a positive effect on the time required altogether for testing.

According to a preferred embodiment, it is provided that the rotor blade component is a rotor blade or a trailing edge of a rotor blade or an end edge of a rotor blade.

Preferably, the rotor blade component is an entire rotor blade. A rotor blade component segment may be a rotor blade segment. A rotor blade segment is in particular a section of a rotor blade. A rotor blade may be divided for example into two or three rotor blade segments and possibly into further rotor blade component segments. In a preferred embodiment, the connection interface may be applied to the connection end of the rotor blade component segment, which may be a segment of the rotor blade.

The rotor blade component may also be a trailing edge of a rotor blade. When the rotor blade moves in the way intended, the trailing edge of a rotor blade is directed substantially in the opposite direction to the direction of movement, that is to say of rotation, of the rotor blade and thus of the aerodynamic rotor of the wind power installation. In a preferred embodiment, the connection interface may be applied to the connection end of the rotor blade component segment, which may be a part of the trailing edge.

The rotor blade component may also be an end edge of a rotor blade. Preferably, the end edge is arranged on the rotor blade in a region of the trailing edge, for example from a central region of the rotor blade as far as the rotor blade tip. Such an end edge may be in the form of a three-dimensional, glass fiber-reinforced element and/or comprise rotor blade material or consist thereof. In a preferred embodiment, the connection interface may be applied to the connection end of the rotor blade component segment, which may be a part of the end edge.

It is further preferable for the method to comprise: applying the connection interface to the connection end, and/or producing the rotor blade component of a rotor blade for a wind power installation, and/or arranging connecting elements and/or tension elements in some or all the cutouts, and/or transporting the rotor blade component segment to a test stand, and/or connecting the rotor blade component segment to a test stand, and/or testing the rotor blade component segment at a test stand, and/or dismounting the rotor blade component segment from a test stand, and/or disposing of the rotor blade component segment.

It is preferable if, after the connection interface has been applied to the connection end of one of the rotor blade component segments, a part of the connection interface and a part of the connection end are cut off, preferably by means of sawing with a wire saw or by means of a circular saw, such that the connection interface and the connection end have edges which are arranged in a plane which is arranged substantially transversely to a rotor blade longitudinal axis. Preferably, the edge of the connection interface and the edge of the connection end are formed by a common saw cut. Preferably, after the connection interface has been applied to the connection end, the connection interface is connected in a materially bonded manner to the rotor blade component segment.

With a connection interface which is applied to one of the rotor blade component segments and is formed as described, it is advantageously possible to attach rotor blade component segments to a test stand. Such a connection interface can be applied to the rotor blade component segment irrespective of the shape and/or contour of the rotor blade component segment. Such a connection interface can be applied to the rotor blade component segment irrespective of the shape and/or contour of the connection end of the rotor blade component segment.

Preferably, producing the rotor blade component of a rotor blade for a wind power installation comprises producing a rotor blade. Producing the rotor blade component of a rotor blade may also comprise producing a trailing edge and/or end edge.

Preferably, a connecting element and/or a tension element can be received in each of the cutouts. The tension element received in one of the cutouts preferably has an outer thread, wherein the inner thread of the cutout and the outer thread of the tension element are preferably configured for engagement with one another. It is preferable for the tension element to comprise steel or to consist thereof. Preferably, the tension element received in one of the cutouts is connected by way of its end protruding from the cutout at a test stand for the purpose of fastening the rotor blade component segment to the test stand.

It is preferable for compensating discs to be arranged between the rotor blade component segment and the test stand to which the rotor blade component segment is connected. The compensating discs can compensate for unevennesses at the face side of the rotor blade component segment such that a reliable connection between the test stand and the rotor blade component segment can be produced. One or more compensating discs may be used. Preferably, compensating discs with different thicknesses are used, so that all the unevennesses are compensated.

Preferably, provision is made for a number of tension elements that corresponds to the number of cutouts, wherein preferably a tension element is or can be arranged in each cutout. In a further preferred embodiment, it is provided that the tension elements are adhesively bonded in the cutouts. In particular, it is preferable for the tension elements to be screwed and adhesively bonded in the cutouts. For this purpose, before the tension elements are introduced into the cutouts, an adhesive is introduced into the cutouts. As adhesive, use is preferably made of low-viscosity adhesives and/or epoxy acrylate- and/or polyurethane acrylate- and/or methyl acrylate-based adhesives.

In a further preferred embodiment, it is provided that the rotor blade component segment and/or the connection material have/has a stiffness which is lower, in particular is a number of times lower, preferably is at least five times lower, for example is at least seven times lower, than the stiffness of a material of the tension element, wherein in particular the modulus of elasticity and/or the shear modulus of the respective material serve(s) as a measure of the stiffness.

It is preferable for the method steps to be realized in the following order: producing the rotor blade component of a rotor blade for a wind power installation, applying the connection interface to the connection end, arranging connecting elements and/or tension elements in some or all the cutouts, transporting the rotor blade component segment to a test stand, connecting the rotor blade component segment to a test stand, testing the rotor blade component segment at a test stand, dismounting the rotor blade component segment from the test stand.

In a preferred embodiment, it is provided that some or all the cutouts are of identical form, and/or some or all the cutouts are configured for receiving connecting elements and/or tension elements for connecting the rotor blade component segment to a test stand, and/or a respective peripheral surface of some or all the cutouts is formed by a connection material, and/or some or all the cutouts are in the form of blind holes, and/or some or all the cutouts are in the form of passage holes, and/or a respective peripheral surface of some or all the cutouts has an inner thread, and/or some or all the cutouts are in the form of bores, and/or some or all the cutouts are spaced apart equidistantly from one another.

It is preferable for the cutouts to have the same diameter and the same length. It is furthermore preferable for the connecting elements and/or tension elements to be connected in a form-fitting and/or materially bonded manner to the cutouts and to be connected in a form-fitting and/or materially bonded manner to the test stand. Preferably, the cutouts are in the form of blind holes, wherein the opening is situated in the face side of the connection interface. One advantage is that it is not necessary for sleeves to be present in the cutouts for transmission of force between the connecting elements and the connection interface.

In a preferred embodiment, it is provided that the connection interface comprises a connection material or consists thereof, and/or applying a connection interface is or comprises laminating on connection material, and/or a first end of the connection interface is aligned with the connection end of the rotor blade component segment, and/or a second end of the connection interface is spaced apart from an end of the rotor blade component segment that is situated opposite the connection end of the rotor blade component segment, and/or the first and second ends of the connection interface are parallel to one another.

It is preferable for the rotor blade component segments to comprise a rotor blade material or to consist substantially of a rotor blade material. It is furthermore preferable for the connection interface to comprise a connection material or to consist substantially of a connection material. In a preferred embodiment, it is provided that the rotor blade material and the connection material are identical. The connection material preferably serves as a thickening and/or reinforcement on the connection end. The connection interface and/or other parts of the rotor blade component segments may preferably consist entirely or predominantly of connection material and/or rotor blade material.

Laminating on connection material is to be understood as meaning in particular applying connection material by means of lamination, wherein preferably multiple layers of fiber/plastic composite material are applied.

A preferred refinement is distinguished in that the connection material is a fiber-reinforced composite material, in particular a fiber/plastic composite material, preferably a glass fiber-reinforced epoxy resin composite material, or comprises such a material, and/or the connection material is identical to a material of the rotor blade component and/or is reinforced in relation to a material of the rotor blade component, and/or the connection interface is arranged on an inner side and/or an outer side of the connection end of the rotor blade component segment, and/or the connection interface extends over the majority of or the entire inner periphery and/or outer periphery of the connection end of the rotor blade component segment.

As fiber materials of the fiber-reinforced composite material, use may preferably be made of organic fibers and/or inorganic fibers and/or natural fibers. Inorganic fibers are for example glass fibers, basalt fibers, boron fibers, ceramic fibers or steel fibers. Organic fibers are for example aramid fibers, carbon fibers, polyester fibers and polyethylene fibers (in particular high performance polyethylene (HPPE) fibers, such as for example Dyneema fibers). Natural fibers are for example hemp fibers, flax fibers or sisal fibers.

It is preferable for the matrix material of the fiber-reinforced composite material to comprise a plastic or to consist thereof. The plastic preferably comprises a thermoplastic and/or a thermoset or consists thereof. Of particular preference are for example thermosets such as polyester resin (UP) and/or epoxy resin and/or thermoplastics such as polyamide. The matrix material of the fiber-reinforced composite material may also comprise cement and/or concrete and/or metal and/or ceramic and/or carbon or consist thereof.

A further preferred refinement is characterized by transporting a further rotor blade component segment or all the further rotor blade component segments of the same rotor blade component to a test stand, and/or connecting a further rotor blade component segment or all the further rotor blade component segments of the same rotor blade component to a test stand, and/or testing a further rotor blade component segment or all the further rotor blade component segments of the same rotor blade component at a test stand, and/or dismounting a further rotor blade component segment or all the further rotor blade component segments of the same rotor blade component from a test stand.

It is preferable for multiple rotor blade component segments of the same rotor blade component to be simultaneously connected to and/or tested at a test stand. In this way, the testing of the rotor blade component can advantageously be carried out in a relatively short period of time.

It is particularly preferable for planar surfaces to be produced on the face surface of the connection interface in the region of the openings of the cutouts, preferably by means of drilling and/or face-milling. Preferably, the planar surfaces substantially lie in a common plane. However, it may also be preferred that the planar surfaces lie on two or more different planes. This has the advantage that, when producing the planar surfaces, it is not necessary to ensure that they lie in a common plane. Rather, a planar surface can be produced in the region of each of the openings of the cutouts that lies in a plane that is different, but preferably parallel, to one or more planar surfaces in the region of one or more other openings of the cutouts. By arranging spacers and/or a filler compound of different thicknesses, it can then be ensured that the sides of the spacers and/or the filler compound intended for arrangement on a test stand lie substantially in a common plane so that, for example, a steel adaptor can be well connected. Preferably, the distances of the planar surfaces from a common reference plane are determined and the thicknesses of the spacers and/or the filler compound are adjusted to these measured distances.

It is furthermore preferable for spacers to be arranged on the face surface of the connection interface in the region of the openings of the cutouts, in particular on the planar surfaces produced. Preferably, the spacers have mutually different thicknesses.

It is furthermore preferable for a filler compound to be applied and/or to be arranged on the face surface of the connection interface in the region of the openings of the cutouts, in particular on the planar surfaces produced. Such a filler compound allows unevennesses to be advantageously compensated and/or avoided.

Preferably, the connecting elements and/or tension elements are arranged in bores, preferably passage bores, of a steel adaptor. Preferably, the connecting elements and/or tension elements are screwed and/or braced against the steel adaptor by way of a screw connection, in particular by means of a nut which is arranged on the connecting element and/or tension element.

A further preferred refinement is characterized by disposing of a further rotor blade component segment or all the further rotor blade component segments of the same rotor blade component.

The disposing may comprise comminuting the rotor blade component segments.

In a preferred embodiment, it is provided that the connection interface has a thickness which corresponds to at least 1.5 times a diameter of some or all the cutouts, in particular to at least 2 times, to at least 2.5 times or to at least 3 times a diameter of some or all the cutouts, and/or the connection interface has a thickness of at least 2 cm (centimeters), preferably of at least 3 cm, of at least 4 cm, of at least 5 cm, of at least 6 cm, of at least 7 cm, of at least 8 cm, of at least 9 cm, of at least 10 cm, of at least 11 cm, of at least 12 cm or of at least 15 cm, and/or the connection interface has a depth which corresponds to at least 2 times a diameter of some or all the cutouts, in particular to at least 3 times, to at least 6 times or to at least 12 times a diameter of some or all the cutouts, and/or the connection interface has a depth of at least 10 cm, preferably of at least 15 cm, of at least 20 cm, of at least 25 cm, of at least 30 cm, of at least 35 cm, of at least 40 cm, of at least 45 cm or of at least 50 cm.

The thickness of the connection interface is to be understood as meaning the extent of the connection interface in the thickness direction, wherein the thickness direction is oriented preferably orthogonally to the longitudinal axis of the rotor blade component segment and/or to the longitudinal axis of the rotor blade segment and/or to the rotor blade longitudinal axis. The depth of the connection interface is to be understood as meaning the extent of the connection interface in the longitudinal direction, wherein the longitudinal direction is oriented preferably parallel to the longitudinal axis of the rotor blade component segment and/or to the longitudinal axis of the rotor blade segment and/or to the rotor blade longitudinal axis.

According to a further aspect, one or more embodiments are directed to a rotor blade component segment of a rotor blade for a wind power installation, the rotor blade component segment comprising a connection end which has been formed by dividing a rotor blade component of a rotor blade for a wind power installation into two, three or more rotor blade component segments, a connection interface at the connection end of the rotor blade component segment, and cutouts which are formed in the connection interface and serve for connection of the rotor blade component segment to a test stand.

The further aspect described above and the possible developments thereof have features and method steps which make it particularly suitable for being used in a method described herein and developments thereof.

With regard to the advantages, embodiment variants and embodiment details of the various aspects of the solutions described here and the respective possible developments thereof, reference is also made to the description pertaining to the corresponding features, details and advantages of the in each case other aspects and the developments thereof.

BRIEF DESCRIPTION OF THE SEVERAL VIEWS OF THE DRAWINGS

Preferred exemplary embodiments will be described by way of example on the basis of the appended figures. In the figures.

In the figures, identical or substantially functionally identical elements are denoted by the same reference signs. General descriptions relate as a rule to all the embodiments, unless differences are explicitly indicated.

DETAILED DESCRIPTION

Figure 1:
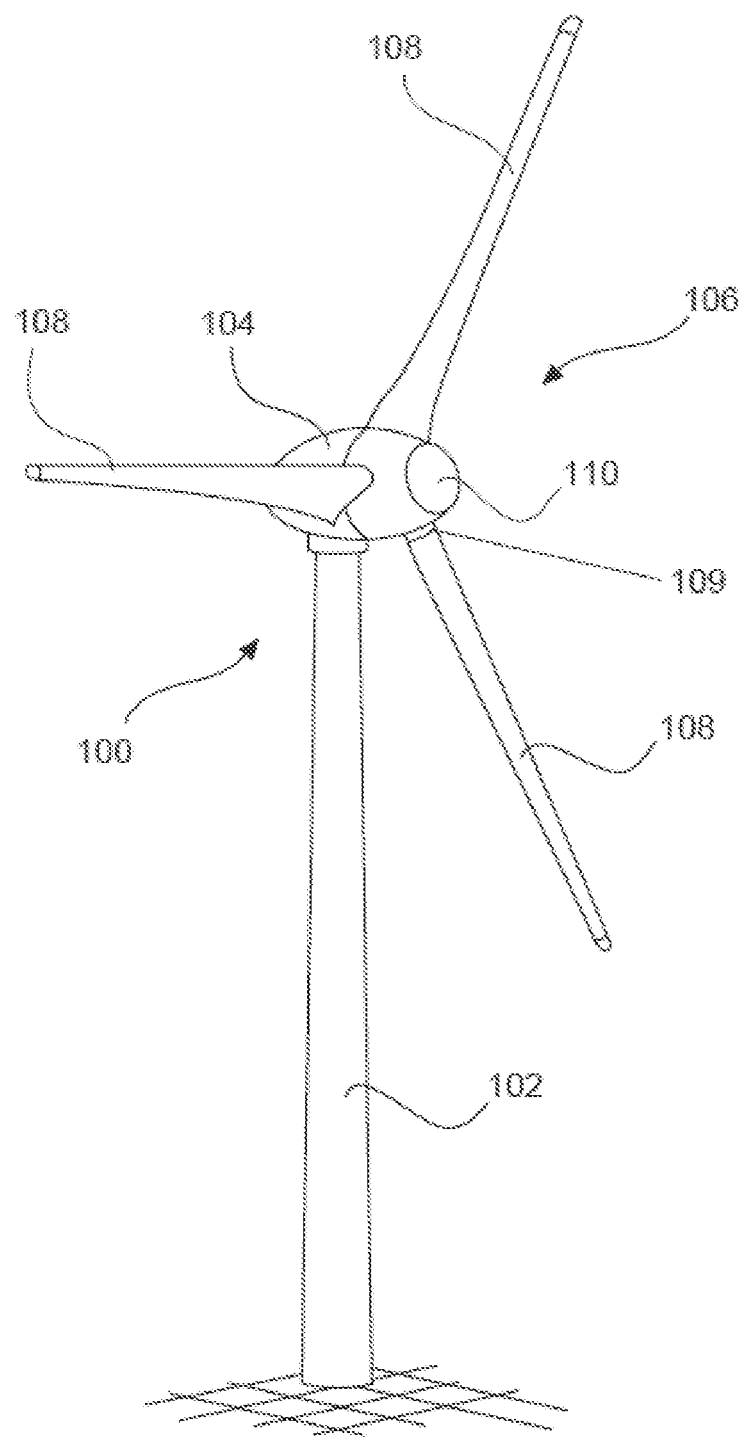
FIG. 1 shows a schematic illustration of a wind power installation.

FIG. 1 shows a schematic illustration of a wind power installation according to the disclosure. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 109 of the respective rotor blades 108.

Figure 2:
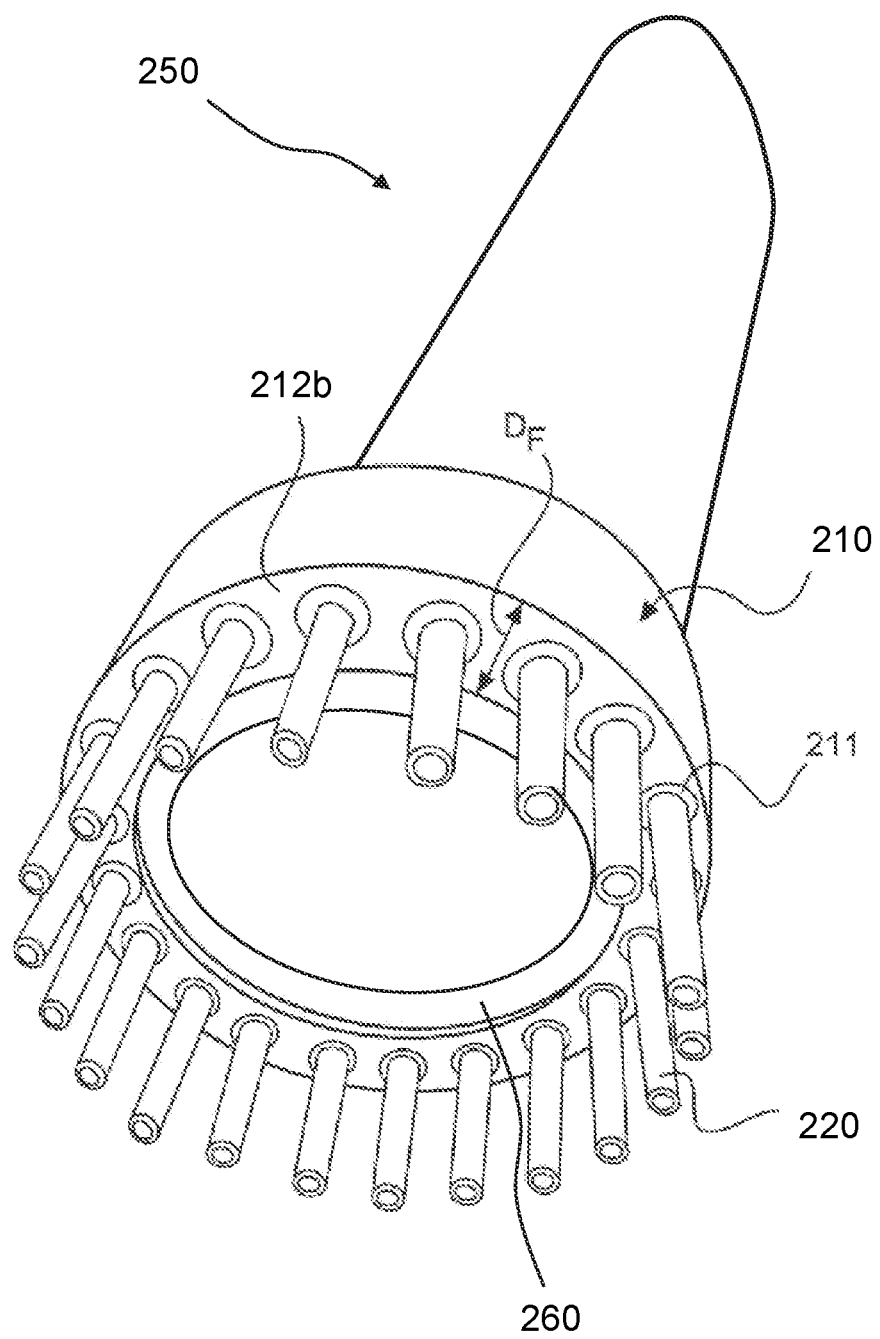
FIG. 2 shows a schematic illustration of a rotor blade component segment in the form of a rotor blade segment with a connection interface.

FIG. 2 shows a schematic illustration of a rotor blade segment 250 with a connection interface 210 with multiple cutouts 211, into which in each case one tension element 220 is introduced. The outer peripheral surface of the respective cutouts 211 is formed by the connection material. The openings of the cutouts 211 are situated in the face surface 212b of the connection interface 210. The face surface 212b of the connection interface is applied to the outer side of the connection end of the rotor blade segment 250. The connection end of the rotor blade segment 250 has a face surface 260 which lies in a plane with the face surface 212b of the connection interface 210. The diameter of the cutouts 211 corresponds preferably to approximately one third, preferably approximately 10 to 50%, in particular approximately 20 to 40%, of the extent $D_F$ of the connection interface 210 orthogonal to a longitudinal axis of the cutout 211 and/or of the rotor blade segment 250.

Figure 3A:
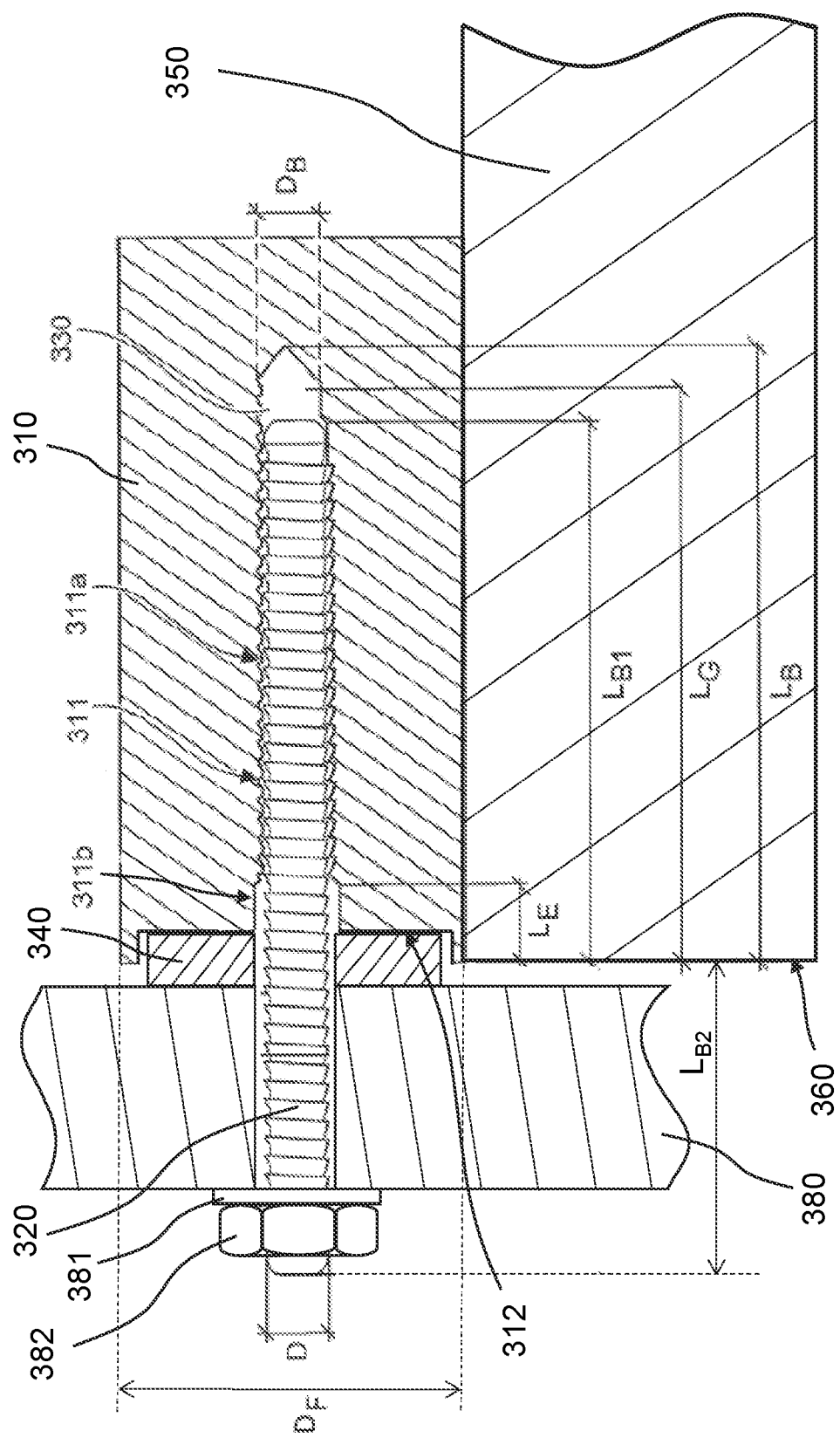
FIG. 3a shows a sectional illustration of a detail of a connection interface at a connection end, wherein compensating discs are attached to the connection interface.

FIG. 3a shows a schematic longitudinal section through a cutout 311 in a connection interface 310 with an introduced tension element 320 having a diameter D and having a total length which is made up of the length $L_{B1}$ of the part received in the cutout 311 and the length $L_{B2}$ of the part protruding from the cutout 311. The outer peripheral surface of the cutout 311 is formed by the connection material. The cutout 311 is in the form of a blind hole, and the opening is situated in the face surface 312 of the connection interface 310. Adhesive 330 has been introduced into the cutout. The cutout 311 is of substantially cylindrical form and has a substantially cylindrical shaft part 311a with a first diameter $D_B$ and has an enlarged head part 311b, adjoining the opening, with a second diameter $D_E$, wherein the second diameter $D_E$ is greater than the first diameter $D_B$. In the longitudinal direction of the cutout, the shaft part 311a is a number of times longer than the head part 311b, which has a length $L_E$. Overall, the cutout 311 has a basic length $L_G$ and a total length $L_B$. This longitudinal extent of the cutout 311 along the longitudinal axis is longer than the length $L_{B1}$ of that part of the tension element 320 which is to be received therein, and corresponds to a number of times the diameter $D_B$ of the cutout 311. The diameter $D_B$ of the cutout 311 corresponds preferably to approximately one third, preferably approximately 10 to 50%, in particular approximately 20 to 40%, of the extent $D_F$ of the connection interface 310 orthogonal to a longitudinal axis of the cutout 311 and/or to a longitudinal axis of the rotor blade component segment 350.

In the exemplary embodiment shown, the connection interface 310 is applied to a connection end of a rotor blade component segment 350, which may be a rotor blade segment. The rotor blade component segment 350 has a face surface 360, which may be arranged in alignment with the face surface 312 of the connection interface 310. Material of the face surface 312 of the connection interface 310 has been removed in a planar manner in a region around the cutouts by means of a milling cutter or by means of a drill, with the result that the face surface 312 has a planar surface. The face surface 312 serves as a bearing surface for a spacer 340. The spacer 340 bears on one side against the face surface 312 and on the opposite side against a steel adaptor 380. The steel adaptor 380 may already constitute a part of the test stand to which the rotor blade component segment 350 is connected via the connection interface 310. The steel adaptor has, for the tension element 320, a passage bore in which the tension element 320 is arranged. The tension element 320 is screwed against the steel adaptor 380 by way of a washer 381 and a nut 382 which is arranged on the thread of the tension element 320.

Preferably, all the tension elements are screwed to the steel adaptor 380 in this manner. Here, use may be made of multiple spacers 340, which may have different thicknesses, wherein the thicknesses may be selected in such a way that those face sides of the spacers 340 which are connected to the steel adaptor 380 lie in a common plane.

In the exemplary embodiment shown, the connection interface 310 may be applied internally or externally to the connection end of the rotor blade component segment 350. Thus, in the embodiment shown, the connection interface 310 may be applied at the inner side or at the outer side to the connection end of the rotor blade component segment 350.

Embodiments with multiple-row connections may also be preferred. Embodiments with a connection interface which is arranged on the inner side and on the outer side at the connection end of the rotor blade component segment may also be preferred. Furthermore, embodiments with a connection interface which is formed at least partially by the rotor blade component segment, preferably by spar caps of the rotor blade component segment, may also be preferred.

The tension element 320 received in the cutout 311 has an outer thread, wherein the inner thread of the cutout 311 and the outer thread of the tension element 320 are configured for engagement with one another.

Figure 3B:
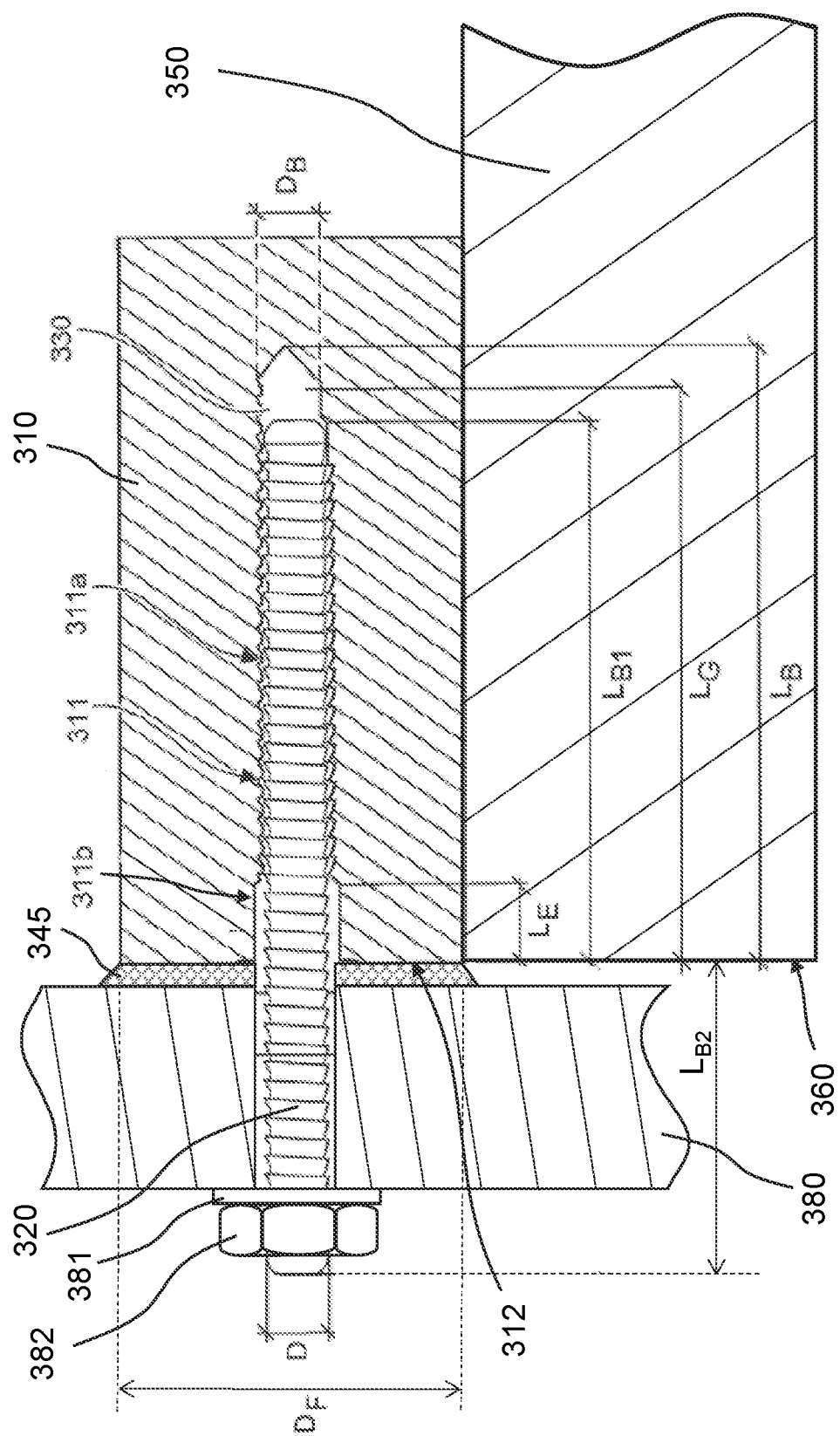
FIG. 3b shows a sectional illustration of a detail of a connection interface at a connection end, wherein a compensating layer is applied to the connection interface.

FIG. 3b shows a schematic longitudinal section through a cutout 311 in a connection interface 310 with an introduced tension element 320 having a diameter D and having a total length which is made up of the length $L_{B1}$ of the part received in the cutout 311 and the length $L_{B2}$ of the part protruding from the cutout 311. The outer peripheral surface of the cutout 311 is formed by the connection material. The cutout 311 is in the form of a blind hole, and the opening is situated in the face surface 312 of the connection interface 310. Adhesive 330 has been introduced into the cutout. The cutout 311 is of substantially cylindrical form and has a substantially cylindrical shaft part 311a with a first diameter $D_B$ and has an enlarged head part 311b, adjoining the opening, with a second diameter $D_E$, wherein the second diameter $D_E$ is greater than the first diameter $D_B$. In the longitudinal direction of the cutout, the shaft part 311a is a number of times longer than the head part 311b, which has a length $L_E$. Overall, the cutout 311 has a basic length $L_G$ and a total length $L_B$. This longitudinal extent of the cutout 311 along the longitudinal axis is longer than the length $L_{B1}$ of that part of the tension element 320 which is to be received therein, and corresponds to a number of times the diameter $D_B$ of the cutout 311. The diameter $D_B$ of the cutout 311 corresponds preferably to approximately one third, preferably approximately 10 to 50%, in particular approximately 20 to 40%, of the extent $D_F$ of the connection interface 310 orthogonal to a longitudinal axis of the cutout 311 and/or to a longitudinal axis of the rotor blade component segment 350.

In the exemplary embodiment shown, the connection interface 310 is applied to a connection end of a rotor blade component segment 350, which may be a rotor blade segment. The rotor blade component segment 350 has a face surface 360, which may be arranged in alignment with the face surface 312 of the connection interface 310.

A filler compound 345 is applied to the face surface 312 of the connection interface 310. It is preferable for the filler compound 345 to comprise epoxy resin or to consist substantially thereof. A steel adaptor 380 is arranged on the filler compound 345. The steel adaptor 380 may already constitute a part of the test stand to which the rotor blade component segment 350 is to be connected via the connection interface 310. The steel adaptor 380 has, for the tension element 320, a passage bore in which the tension element 320 is arranged. The tension element 320 is screwed against the steel adaptor 380 by way of a washer 381 and a nut 382 which is arranged on the thread of the tension element 320. With the filler compound 345, it is in particular possible for unevennesses of the face surface 312 to be compensated.

Preferably, all the tension elements are screwed to the steel adaptor 380 in this manner. Here, the filler compound 345 may be applied around all the tension elements. The filler compound may have, at different positions, mutually different thicknesses, wherein the thicknesses may be selected in such a way that the filler compound 345 forms a plane on that side on which the filler compound 345 is connected to the steel adaptor 380.

The connection interface 310 may in particular be applied internally or externally to the connection end of the rotor blade component segment 350. Thus, in the embodiment shown, the connection interface 310 may be applied at the inner side or at the outer side to the connection end of the rotor blade component segment 350.

Embodiments with multiple-row connections may also be preferred. Embodiments with a connection interface which is arranged on the inner side and on the outer side at the connection end of the rotor blade component segment may also be preferred. Furthermore, embodiments with a connection interface which is formed at least partially by the rotor blade component segment, preferably by spar caps of the rotor blade component segment, may also be preferred.

The tension element 320 received in the cutout 311 has an outer thread, wherein the inner thread of the cutout 311 and the outer thread of the tension element 320 are configured for engagement with one another.

Figure 3C:
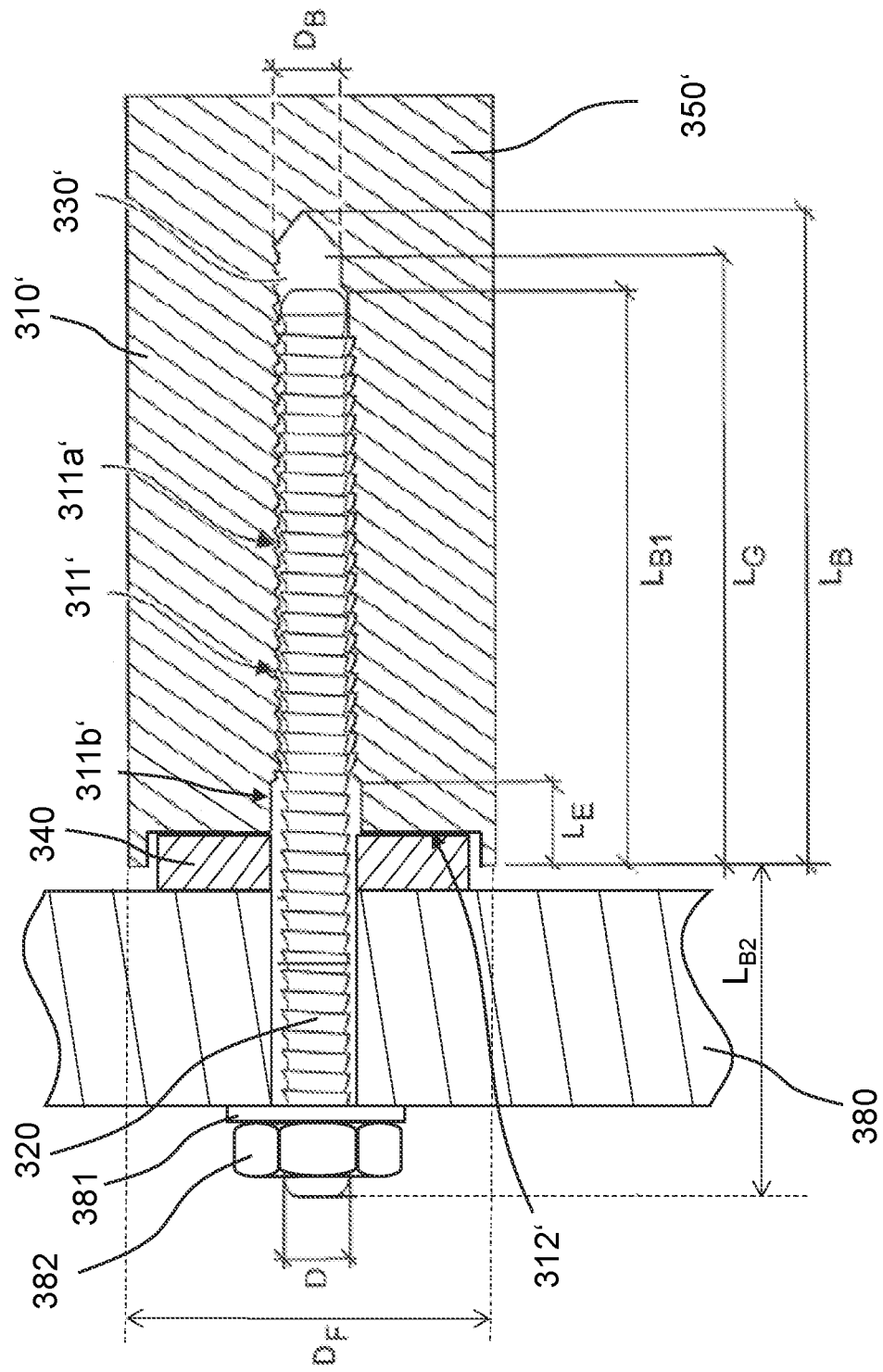
FIG. 3c shows a sectional illustration of a detail of a connection interface at a connection end, wherein compensating discs are attached to the connection interface and the connection interface is formed by a rotor blade component segment.

FIG. 3c shows a sectional illustration of a detail of a connection interface 310' at a connection end, wherein, as in FIG. 3a, a steel adaptor 380 is attached to the connection interface 310'. By contrast to the exemplary embodiment shown in FIG. 3a, in the exemplary embodiment shown in FIG. 3c, the connection interface 310' is formed by a rotor blade component segment 350'. The cutout 311' is arranged in a spar cap of the rotor blade component segment 350'. The tension element 320 is received in the cutout 311' in the spar cap. The rest of the construction is analogous to the construction of the exemplary embodiment shown in FIG. 3a.

Figure 3D:
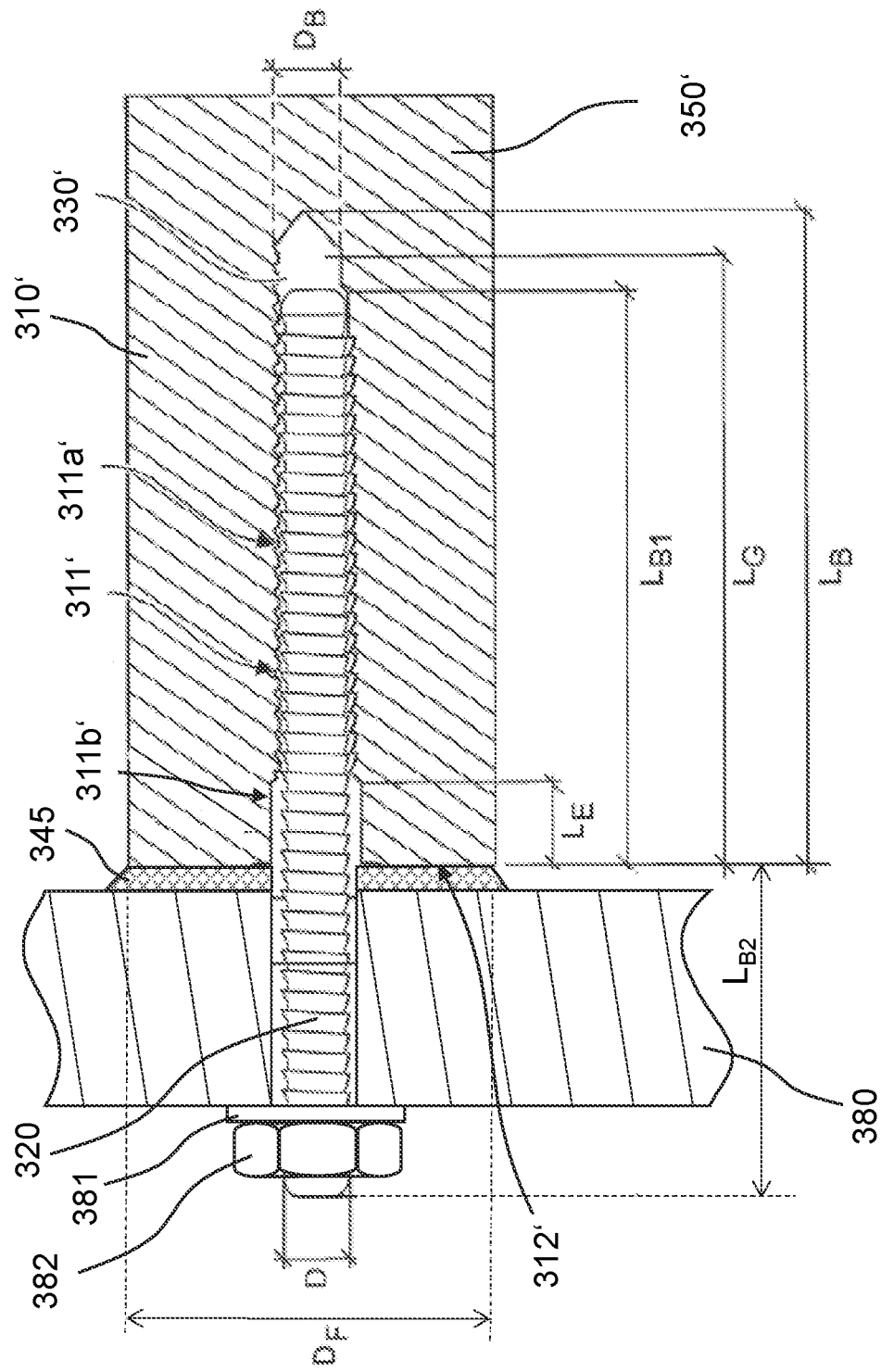
FIG. 3d shows a sectional illustration of a detail of a connection interface at a connection end, wherein a compensating layer is applied to the connection interface and the connection interface is formed by a rotor blade component segment.

FIG. 3d shows a sectional illustration of a detail of a connection interface 310' at a connection end, wherein, as in FIG. 3b, a steel adaptor 380 is attached to the connection interface 310'. By contrast to the exemplary embodiment shown in FIG. 3b, in the exemplary embodiment shown in FIG. 3d, the connection interface 310' is formed by a rotor blade component segment 350'. The cutout 311' is arranged in a spar cap of the rotor blade component segment 350'. The tension element 320 is received in the cutout 311' in the spar cap. The rest of the construction is analogous to the construction of the exemplary embodiment shown in FIG. 3b.

Figure 4A:
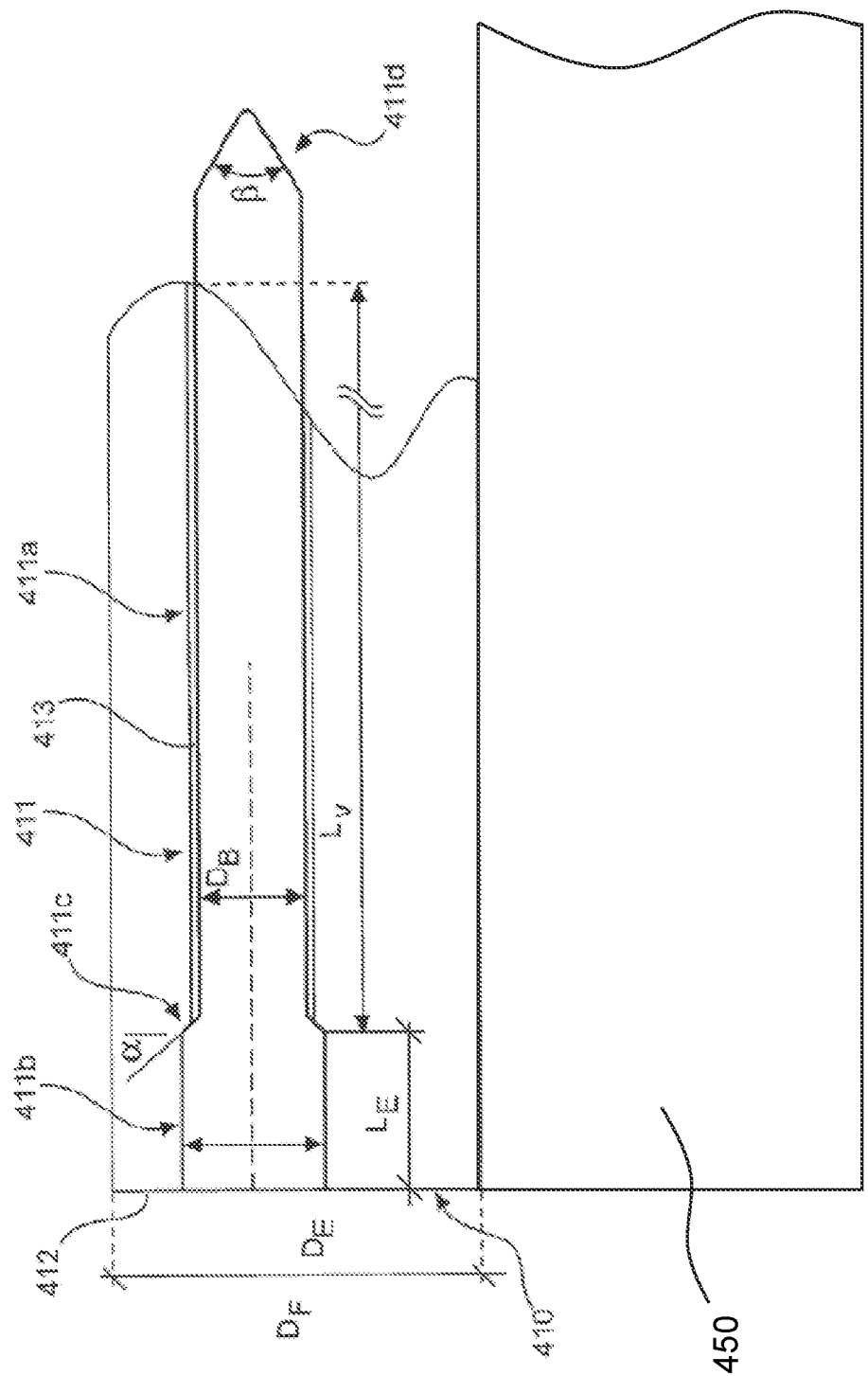
FIG. 4a shows a sectional illustration of a detail of a connection interface at a connection end.

FIG. 4a shows a schematic longitudinal section through a cutout 411 in a connection interface 410. The outer peripheral surface of the cutout 411 is formed by the connection material. The cutout 411 is in the form of a blind hole, and the opening is situated in the face surface 412 of the connection interface 410. The cutout 411 is of substantially cylindrical form and has a substantially cylindrical shaft part 411a with a first diameter $D_B$ and has an enlarged head part 411b, adjoining the opening, with a second diameter $D_E$, wherein the second diameter $D_E$ is greater than the first diameter $D_B$. Between the enlarged head part 411b and the shaft part 411a, there is formed a transition section 411c, which preferably has an inclination angle α of 30 to 60°, in particular of 45°. At the closed end of the blind hole, there is formed an end section 411d, which preferably has an inclination angle ß of 60 to 120°. The shaft part 411a has an inner thread 413, which is cut directly into the connection material.

In the longitudinal direction of the cutout, the shaft part 411a, which has a length $L_V$, is a number of times longer than the head part 411b, which has a length $L_E$. The longitudinal extent of the cutout 411 along the longitudinal axis corresponds to a number of times the diameter $D_B$ of the cutout 411. The diameter $D_B$ of the cutout 411 corresponds preferably to approximately one third, preferably approximately 10 to 50%, in particular approximately 20 to 40%, of the extent $D_F$ of the connection interface 410 orthogonal to a longitudinal axis of the cutout 411 and/or to a longitudinal axis of the rotor blade.

In the exemplary embodiment shown, the connection interface 410 is applied to a connection end of a rotor blade component segment 450, which may be a rotor blade segment. The rotor blade component segment 450 has a face surface which is arranged in alignment with the face surface 412 of the connection interface 410. The connection interface 410 may in particular be applied internally or externally to the connection end of the rotor blade component segment 450. Thus, in the embodiment shown, the connection interface 410 may be applied at the inner side or at the outer side to the connection end of the rotor blade component segment 450.

The connection interfaces 210, 310, 410 preferably comprise a connection material which is identical to a rotor blade material. It is furthermore preferable for the connection interfaces 210, 310, 410 to be connected in a materially bonded manner to the rotor blade component segment.

Via said connection interfaces 210, 310, 410, the rotor blade component segment can be fixed, in each case by means of connecting elements and/or tension elements, to a test stand for the purpose of testing the rotor blade component segment.

Preferably, the diameter $D_E$ is approximately 1.25 times the diameter $D_B$. Furthermore preferably, the length $L_E$ is preferably approximately 1.5 times the diameter $D_B$. Preferably, the length $L_V$ is approximately 6 times the diameter $D_B$.

Figure 4B:
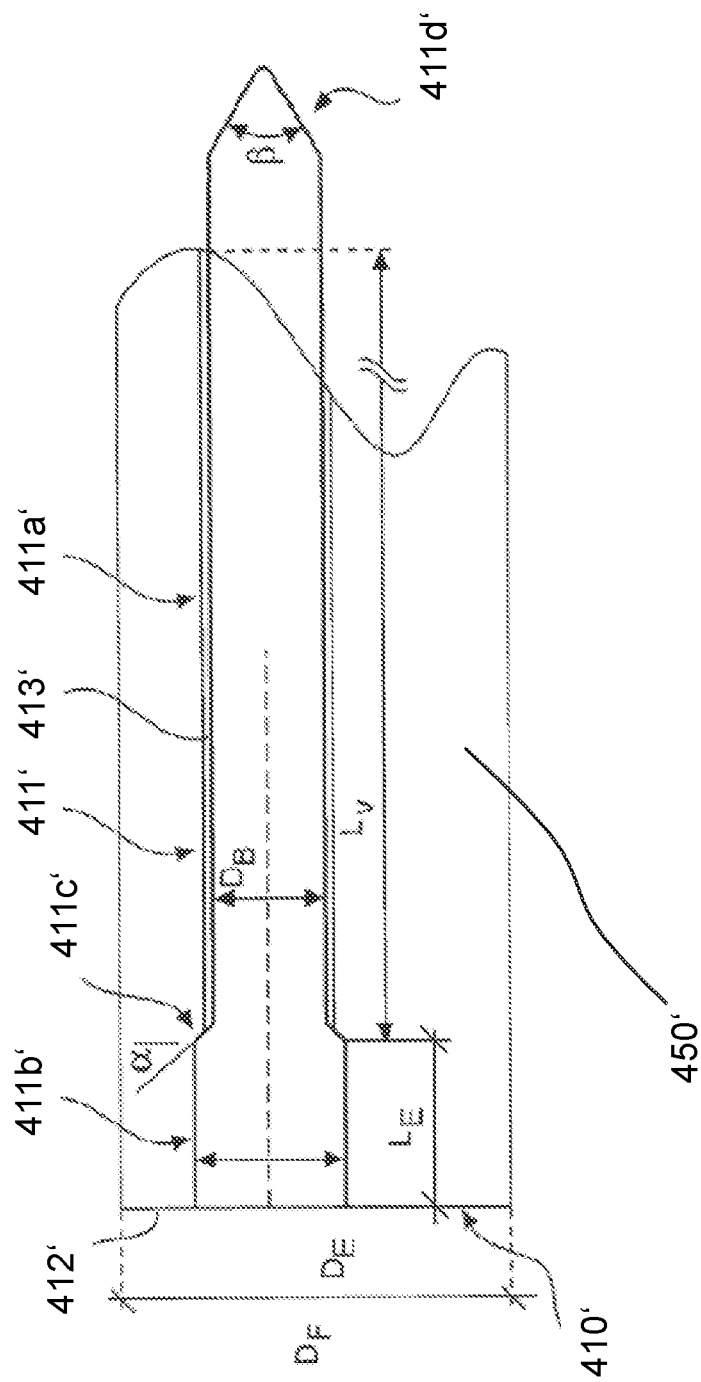
FIG. 4b shows a sectional illustration of a detail of a connection interface at a connection end, wherein the connection interface is formed by a rotor blade component segment.

FIG. 4b shows a schematic longitudinal section through a cutout 411' in a connection interface 410'. By contrast to the exemplary embodiment shown in FIG. 4a, in the exemplary embodiment shown in FIG. 4b, the connection interface 410' is formed by a rotor blade component segment 450'. The cutout 411' is arranged in a spar cap of the rotor blade component segment 450'. The rest of the construction is analogous to the exemplary embodiment shown in FIG. 4a.

Figure 5A:
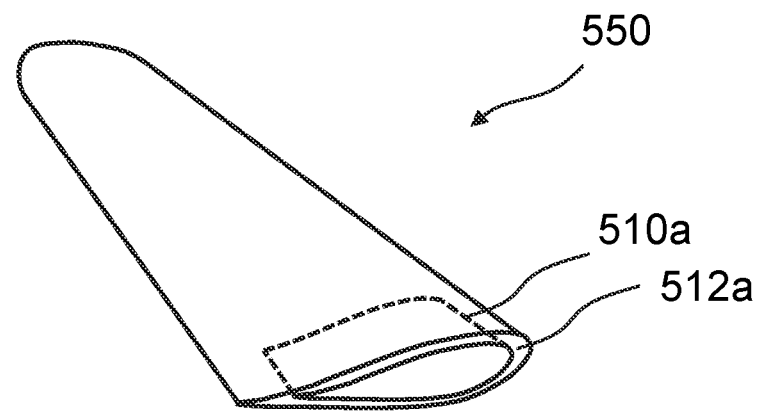
FIG. 5a shows a schematic illustration of a rotor blade component segment in the form of a rotor blade segment with a connection interface applied to the inner side of the rotor blade component segment.

FIG. 5a shows a rotor blade segment 550 with a connection interface 510a applied to the connection end of the rotor blade segment 550. The connection interface 510a is arranged on the inner side of the connection end of the rotor blade segment 550. The connection interface has a face surface 512a which is aligned with the face surface of the connection end of the rotor blade segment 550.

Figure 5B:
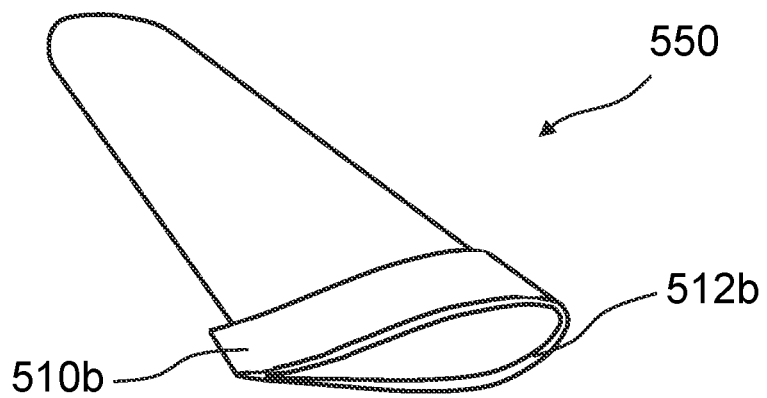
FIG. 5b shows a schematic illustration of a rotor blade component segment in the form of a rotor blade segment with a connection interface applied to the outer side of the rotor blade component segment.

FIG. 5b shows a rotor blade segment 550 with a connection interface 510b applied to the connection end of the rotor blade segment 550. The connection interface 510b is arranged on the outer side of the connection end of the rotor blade segment 550. The connection interface has a face surface 512b which is aligned with the face surface of the connection end of the rotor blade segment 550.

Figure 5C:
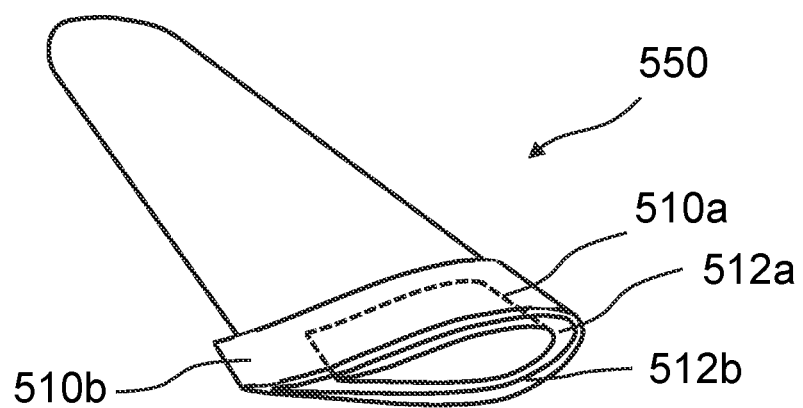
FIG. 5c shows a schematic illustration of a rotor blade component segment in the form of a rotor blade segment with a connection interface applied to the inner side and to the outer side of the rotor blade component segment.

FIG. 5c shows a rotor blade segment 550 with a connection interface 510, 510b applied to the connection end of the rotor blade segment 550. The connection interface 510a, 510b is arranged on the inner side and on the outer side of the connection end of the rotor blade segment 550. The connection interface has a face surface 512a, 512b which is aligned with the face surface of the connection end of the rotor blade segment 550.

Via said connection interface 510a, 510b, the rotor blade segment can be fixed, by means of connecting elements and/or tension elements, to a test stand for the purpose of testing the rotor blade segment.

Figure 6:
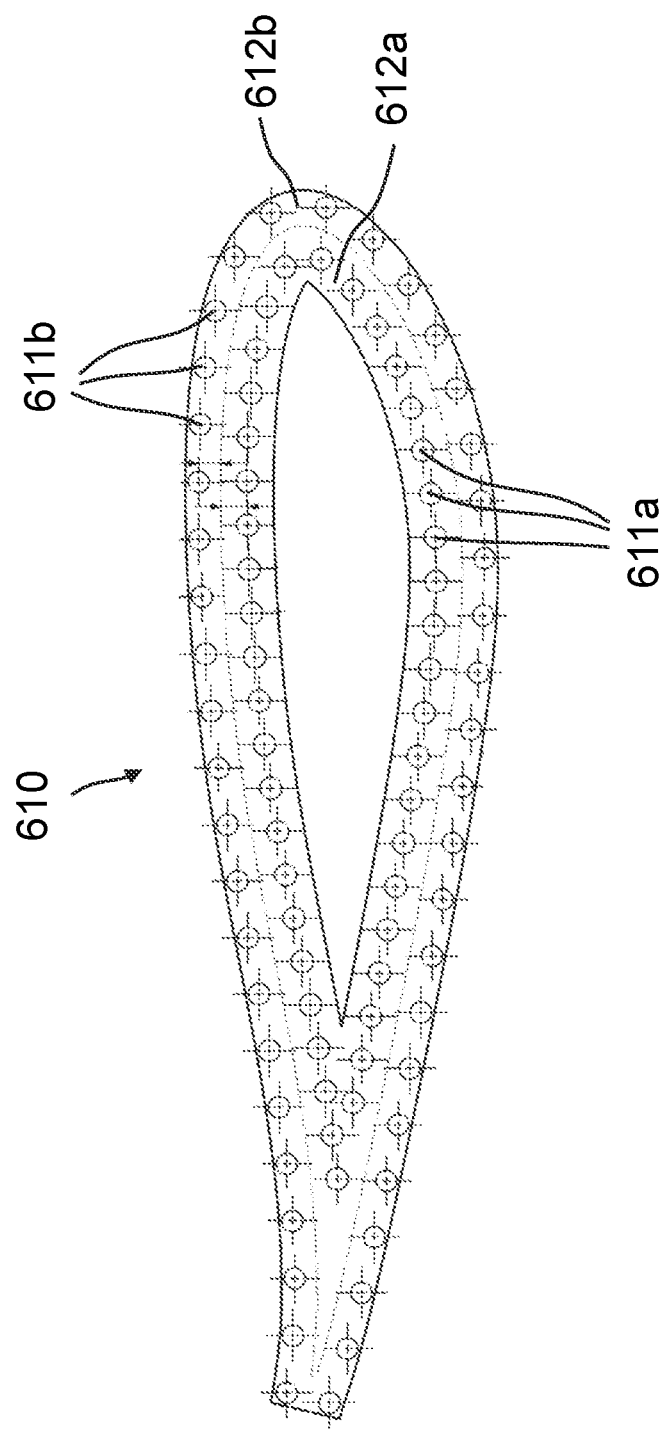
FIG. 6 shows a schematic illustration of a plan view of the edge of a rotor blade component segment with a connection interface applied to the inner side and to the outer side of the rotor blade component segment.

FIG. 6 shows a plan view of a connection interface 610 of a rotor blade segment. The connection interface 610 is applied internally and externally to the connection end of the rotor blade segment. Consequently, the connection interface 610 comprises a part which is applied to the inner side and which has a face surface 612a of the part applied to the inner side, and comprises a part which is applied to the outer side and which has a face surface 612b of the part applied to the outer side. The face surface of the connection interface 612a, 612b is aligned with the face surface of the connection end of the rotor blade segment. The cutouts 611a, 611b at the connection interface 610 are formed in two rows. The connection interface 610 has inner cutouts 611a and outer cutouts 611b. Via said connection interface 610, the rotor blade segment can be connected, by means of connecting elements and/or tension elements, to a test stand.

Figure 7:
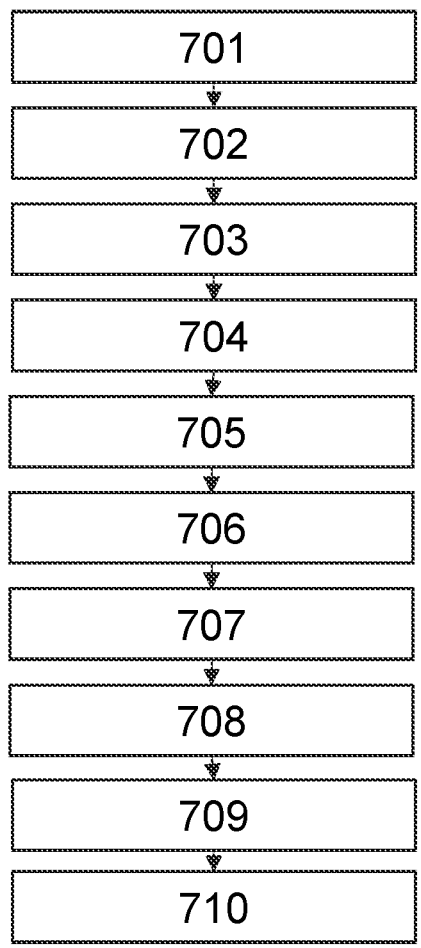
FIG. 7 shows a schematic illustration of an example of a method for testing a rotor blade component of a rotor blade for a wind power installation.

FIG. 7 shows a schematic illustration of a method 700 for testing a rotor blade component of a rotor blade for a wind power installation. The method 700 comprises the following steps: In a step 701, producing the rotor blade component of a rotor blade for a wind power installation. In a step 702, dividing a rotor blade component of a rotor blade for a wind power installation into two, three or more rotor blade component segments. In a step 703, applying the connection interface to a connection end of one of the rotor blade component segments. In a step 704, forming cutouts in the connection interface at the connection end, and preferably producing planar sections on the face surface of the connection interface in the region of the openings of the cutouts, preferably by means of drilling and/or face-milling, and preferably arranging spacers on the face surface in the region of the cutouts. It is preferable for the spacers to have individually matched thicknesses, such that the spacers can compensate unevennesses. In a step 705, arranging connecting elements and/or tension elements in some or all the cutouts, and preferably applying a filler compound to the face surface of the connection interface. The filler compound may comprise epoxy resin or consist substantially thereof. In a step 706, transporting the rotor blade component segment to a test stand. In a step 707, connecting the rotor blade component segment to a test stand. In a step 708, testing the rotor blade component segment at a test stand. In a step 709, dismounting the rotor blade component segment from a test stand. In a step 710, disposing of the rotor blade component segment.

Figure 8:
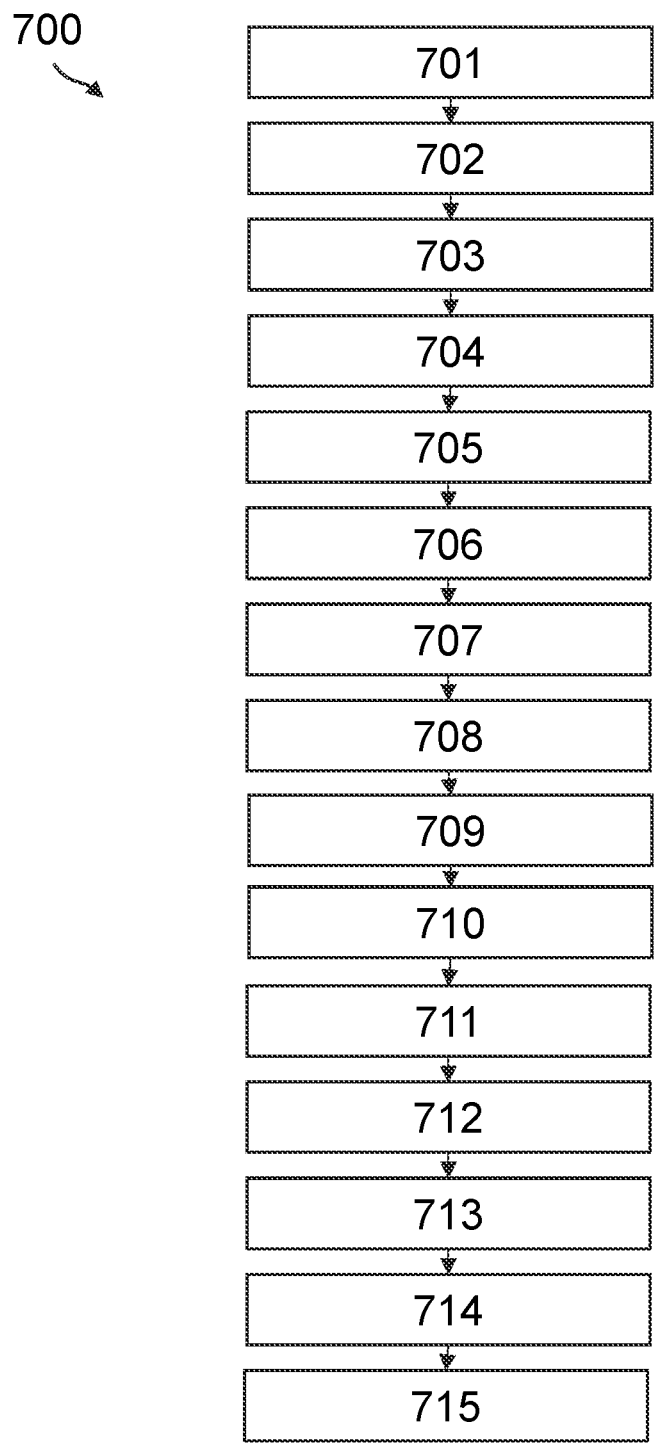
FIG. 8 shows a schematic illustration of a further example of a method for testing a rotor blade component of a rotor blade for a wind power installation.

FIG. 8 shows a schematic illustration of a method 700 for testing a rotor blade component of a rotor blade for a wind power installation. Here, the method described in FIG. 7 furthermore comprises additional steps: In a step 711, transporting a further rotor blade component segment or all the further rotor blade component segments of the same rotor blade component to a test stand. In a step 712, connecting a further rotor blade component segment or all the further rotor blade component segments of the same rotor blade component to a test stand. In a step 713, testing a further rotor blade component segment or all the further rotor blade component segments of the same rotor blade component at a test stand. In a step 714, dismounting a further rotor blade component segment or all the further rotor blade component segments of the same rotor blade component from a test stand. In a step 715, disposing of a further rotor blade component segment or all the further rotor blade component segments of the same rotor blade component.

LIST OF REFERENCE SIGNS

100 Wind power installation
102 Tower
104 Nacelle
106 Rotor
108 Rotor blades
109 Rotor blade roots
110 Spinner
210, 310, 410, 510a, 510b, 610, 310', 410' Connection interface
211, 311, 411, 611a, 611b, 311', 411' Cutouts
212, 312, 412, 512a, 512b, 612a, 612b, 312', 412' Face surface of the connection interface
220, 320 Tension element
250, 550 Rotor blade segment
260, 360 Face surface of the connection end of the rotor blade segment
311a, 411a, 311a', 411a' Shaft part of the cutout
311b, 411b, 311b', 411b' Head part of the cutout
330, 330' Adhesive
340 Spacer
345 Filler compound 350, 450, 350', 450' Rotor blade component segment
380 Steel adaptor
381 Washer
382 Nut
411c, 411c' Transition section of the cutout
411d, 411d' End section of the cutout
413, 413' Inner thread
700-715 Method steps
D Diameter of the tension element
$D_F$ Extent of the connection interface
$D_B$ First diameter
$D_E$ Second diameter
$L_{B1}$ Length of that part of the tension element received in the cutout
$L_{B2}$ Length of that part of the tension element protruding from the cutout
$L_E$ Length of the head part of the cutout
$L_G$ Basic length
$L_V$ Length of the shaft part of the cutout The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for testing a rotor blade component of a rotor blade for a wind power installation, the method comprising:
   dividing a rotor blade component of the rotor blade into a plurality of rotor blade component segments, and
   forming a plurality of cutouts in a connection interface at a connection end of a first rotor blade component segment of the plurality of rotor blade component segments,
   wherein:
      the connection interface has a thickness corresponding to at least 1.5 times a diameter of one or more of the plurality of cutouts, and/or
      the connection interface has a thickness of at least 2 cm, and/or
      the connection interface has a depth which corresponds to at least 2 times a diameter of one or more of the plurality of the cutouts, and/or
      the connection interface has a depth of at least 10 cm.

2. The method according to claim 1, wherein the rotor blade component is a trailing edge of the rotor blade or an end edge of the rotor blade.

3. The method according to claim 1, further comprising:
   applying the connection interface to the connection end, and/or
   producing the rotor blade component of a rotor blade for a wind power installation, and/or
   arranging a plurality of connecting elements and/or a plurality of tension elements in some or all of the plurality of cutouts.

4. The method according to claim 3, comprising:
   applying the connection interface comprises laminating on a connection material of the connection interface, and/or
   aligning a first end of the connection interface with the connection end of the rotor blade component segment, and/or
   wherein a second end of the connection interface is spaced apart from an end of the rotor blade component segment, the rotor blade component segment being opposite the connection end of the rotor blade component segment, and/or
   wherein the first and second ends of the connection interface are parallel to one another.

5. The method according to claim 1, further comprising:
   transporting the rotor blade component segment to a test stand,
   connecting the rotor blade component segment to the test stand,
   testing the rotor blade component segment at the test stand,
   dismounting the rotor blade component segment from the test stand, and
   disposing of the rotor blade component segment.

6. The method according to claim 1, wherein:
   at least some of the plurality of cutouts have identical shapes, and/or
   at least some of the plurality of cutouts are configured for receiving a plurality of connecting elements, respectively, and/or a plurality of tension elements, respectively, for connecting the rotor blade component segment to a test stand, and/or
   a respective peripheral surface of at least some of the plurality of the cutouts is formed by a connection material, and/or
   at least some of the plurality of cutouts are blind holes, and/or
   at least some of the plurality of cutouts are through passage holes, and/or
   a respective peripheral surface of at least some of the plurality of cutouts has an inner thread, and/or
   at least some of the plurality of cutouts are bores, and/or
   at least some of the plurality of cutouts are spaced apart equidistantly from one another.

7. The method according to claim 1, wherein:
   the connection material comprises at least one of a fiber-reinforced composite material, a fiber-plastic composite material, or a glass fiber-reinforced epoxy resin composite material, and/or
   the connection material is identical to a material of the rotor blade component and/or is reinforced with a material of the rotor blade component, and/or
   the connection interface is arranged on at least one of an inner side or an outer side of the connection end of the rotor blade component segment, and/or
   the connection interface extends over at least a portion of the inner periphery and/or outer periphery of the connection end of the rotor blade component segment.

8. The method according to claim 1, comprising:
   transporting at least one rotor blade component segment of the plurality of rotor blade component segments of a same rotor blade component to a test stand,
   connecting the at least one rotor blade component segment of the plurality of rotor blade component segments of the same rotor blade component to the test stand, and
   testing the at least one rotor blade component segment of the plurality of rotor blade component segments of the same rotor blade component at the test stand.

9. The method according to claim 1, further comprising disposing of a second rotor blade component segment of the plurality of rotor blade component segments of the same rotor blade component.

10. The method according to claim 1, comprising arranging spacers on a face surface of the connection interface in a region of openings of the plurality of cutouts.

11. The method according to claim 10, wherein:
the spacers have mutually different thicknesses, and/or
the spacers have individually matched thicknesses such that the spacers are configured to compensate for unevennesses, and/or
the spacers have different thicknesses, wherein the thicknesses are selected in such a way that face sides of the spacers are connectable to a steel adaptor lie in a common plane.

12. The method according to claim 1, comprising providing a filler compound on a surface of the connection interface in a region of the plurality of cutouts.

13. The method according to claim 12, wherein the filler compound has, at different positions, mutually different thicknesses, wherein the different thicknesses are selected in such a way that the filler compound forms a plane on that side on which the filler compound is connectable to a steel adaptor.

14. The method according to claim 1, arranging spacers on planar surfaces on a face surface of the connection interface, and applying filler compound on the planar surfaces of the face surface of the connection interface.

15. The method according to claim 1, comprising producing planar surfaces on a face surface of the connection interface in a region of openings of the plurality of cutouts.

16. The method according to claim 15, wherein producing comprising at least one of drilling or milling.

17. The method according to claim 15, wherein the planar surfaces lie on two or more different planes, and/or wherein distances of the planar surfaces from a common reference plane are determined and thicknesses of the spacers and/or filler compound are adjusted to the distances.

18. A rotor blade component segment of a rotor blade for a wind power installation, the rotor blade component segment comprising:
a connection end of a rotor blade component segment separated from a rotor blade component of a rotor blade for a wind power installation,
a connection interface at the connection end of the rotor blade component segment, and
a plurality of cutouts at the connection interface, wherein the plurality of cutouts are configured for connection of the rotor blade component segment to a test stand,
wherein:
the connection interface has a thickness corresponding to at least 1.5 times a diameter of one or more of the plurality of cutouts, and/or
the connection interface has a thickness of at least 2 cm, and/or
the connection interface has a depth which corresponds to at least 2 times a diameter of one or more of the plurality of the cutouts, and/or
the connection interface has a depth of at least 10 cm.

19. The rotor blade component segment according to claim 18, wherein spacers are arranged on a face surface of the connection interface in a region of openings of the plurality of cutouts, and/or a filler compound is on a face surface of the connection interface in the region of openings of the plurality of cutouts.

* * * * *